(12) United States Patent
Huegerich et al.

(10) Patent No.: US 8,186,393 B2
(45) Date of Patent: May 29, 2012

(54) FLUID COUPLER INCLUDING VALVE ARRANGEMENT FOR CONNECTING INTAKE CONDUIT OF SPRAYER TO TRANSFER CONDUIT OF NURSE TANK DURING REFILL OPERATION

(75) Inventors: Daniel Joseph Huegerich, Ankeny, IA (US); Travis Gene Funseth, Ankeny, IA (US); Tonya Marie O'neal, Davenport, IA (US); Richard Allen Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 978 days.

(21) Appl. No.: 12/178,893

(22) Filed: Jul. 24, 2008

(65) Prior Publication Data

US 2010/0019485 A1    Jan. 28, 2010

(51) Int. Cl.
*B65B 1/04* (2006.01)
*F16L 37/28* (2006.01)
*E03B 1/00* (2006.01)

(52) U.S. Cl. ........ 141/294; 141/287; 141/293; 141/382; 141/387; 251/149.6; 137/614.03; 137/614.04; 137/614.05

(58) Field of Classification Search .................. 141/287, 141/293, 294, 347, 382, 387, 351; 137/614.03, 137/614.04, 614.05, 614, 798; 251/149.1, 251/149.6; 244/135 A, 172.6; 277/605, 277/646

See application file for complete search history.

(56) References Cited

U.S. PATENT DOCUMENTS

| | | | |
|---|---|---|---|
| 3,222,076 A | | 12/1965 | Hollingsworth |
| 3,474,827 A | * | 10/1969 | Rosell ...................... 137/614.03 |
| 3,519,035 A | * | 7/1970 | Remane .......................... 141/52 |
| 3,851,852 A | * | 12/1974 | Blanchard et al. ......... 251/149.1 |
| 5,887,619 A | * | 3/1999 | Keary ....................... 137/614.18 |
| 7,156,058 B1 | * | 1/2007 | Lou ............................. 123/90.12 |
| 7,258,539 B2 | * | 8/2007 | Lowe et al. ................. 425/192 R |
| 7,503,510 B2 | * | 3/2009 | Vickers et al. .................. 239/69 |
| 2004/0084551 A1 | * | 5/2004 | Vickers et al. .................. 239/69 |

FOREIGN PATENT DOCUMENTS

| | | |
|---|---|---|
| EP | 0 220 336 | 5/1987 |
| EP | 0 220 336 | 1/1989 |
| EP | 0 554 640 | 8/1993 |
| GB | 1 078 576 | 8/1967 |
| JP | 361 244 896 | 10/1986 |
| WO | 92/14960 | 9/1992 |
| WO | 02/44605 | 6/2002 |
| WO | 2004/049086 | 6/2004 |

OTHER PUBLICATIONS

European Search Report, Feb. 17, 2010, 15 Pages.

* cited by examiner

*Primary Examiner* — Timothy L Maust

(57) ABSTRACT

A nurse vehicle carries a supply of liquid chemicals or fertilizer for being applied by a sprayer vehicle. A fluid transfer conduit of the nurse vehicle has an end defined by a receptacle that is selectively connected to a complementary dimensioned insert defining an end of a fluid intake conduit of the sprayer vehicle. The receptacle and insert define a coupler assembly that includes an inflatable seal that surrounds the insert and locks the insert and receptacle together when inflated. Flow through the coupler assembly is controlled by first and second poppet valves, which are normally closed preventing flow through valve bodies of the receptacle and insert. Selective inflation of the seal and opening and closing of the poppet valves is automatically controlled in accordance with sequencing logic of an electronic controller so the seal is inflated before the valves are opened and remains inflated until the valves are closed.

5 Claims, 6 Drawing Sheets

FLUID COUPLER INCLUDING VALVE ARRANGEMENT FOR CONNECTING INTAKE CONDUIT OF SPRAYER TO TRANSFER CONDUIT OF NURSE TANK DURING REFILL OPERATION

FIELD OF THE INVENTION

The present invention relates to agricultural sprayers, and more specifically relates to a valve coupler arrangement for facilitating the transfer of fluid from a nurse tank to the sprayer.

BACKGROUND OF THE INVENTION

It has recently become known to equip a sprayer vehicle and a nurse tank vehicle with a fluid coupler arrangement by which a fluid transfer conduit extending from the nurse tank can be manually or automatically connected to an intake fluid conduit leading to a sprayer tank. After making the connection, the operator opens a series of valves to establish a fluid path permitting fluid to flow from the nurse vehicle tank to the sprayer vehicle tank or tanks. Such a coupling arrangement is described in U.S. patent application Ser. No, 10/284,002, flied 30 Oct. 2002 and published under No, 200400484551, and now issued as U.S. Pat. No. 7,503,510, granted Mar. 17, 2004.

After the fluid tank or tanks of the sprayer vehicle have been refilled, the operator must close valves and disconnect the fluid coupler interconnecting the transfer and intake conduits in a manner which prevents or limits fluid chemicals from spilling onto the ground. One drawback of current large fittings and valves that are required for quickly transferring fluid chemicals from the nurse tank to the sprayer tank or tanks is that they permit significant spillage of the chemicals.

The problem to be solved then is to provide a coupler arrangement between the transfer and intake conduits of the nurse and sprayer vehicles which permits a relatively quick transfer of fluid chemicals while minimizing spillage of such chemicals.

SUMMARY OF THE INVENTION

According to the present invention, there is provided a coupler arrangement for selectively connecting a nurse tank fluid transfer conduit to, and disconnecting the transfer hose from, a sprayer fluid intake conduit.

An object of the invention is to provide a coupler arrangement including a first coupler section connected to an end of a nurse tank fluid transfer conduit, and a second coupler section connected to an end of fluid intake conduit of a sprayer, with the first and second coupler sections being designed for cooperating, during being coupled together and uncoupled from each other, so as to eliminate any significant spillage of fluid chemicals.

The foregoing object is achieved by a coupler arrangement wherein the first and second coupler sections each include a hollow body defining a fluid passage, with the fluid passage of the first coupler section including a discharge opening normally closed by a first flow control valve such as a first poppet valve, which is spring loaded, and with the fluid passage of the second coupling section including an inlet opening normally closed by a second flow control valve such as a second poppet valve which is loaded to its closed position by the spring acting on the first poppet valve when a cylindrical insert defined at the end of one of the first and second coupler sections is seated within a cylindrical receptacle defined at the end of another of the first and second coupler sections, with a remotely operable power actuator being located within the hollow body of the second coupler section and connected to the second poppet valve so that the actuator can be selectively operated to open the first and second poppet valves against the spring load. The coupler section which defines the insert includes an annular seal groove containing an inflatable seal which may be selectively inflated for preventing leakage and establishing a tight friction lock between the insert and the receptacle once the insert is property seated in the receptacle. A proximity device is provided which senses when the insert is properly located in the receptacle and sends a signal to the operator prior to the inflation of the seal. Once the seal is inflated, the actuator is actuated for effecting the opening of both poppet valves so as to establish an uninterrupted fluid path through which fluid can flow from the nurse vehicle to the sprayer vehicle.

DESCRIPTION OF THE PREFERRED EMBODIMENT

Figure 1:
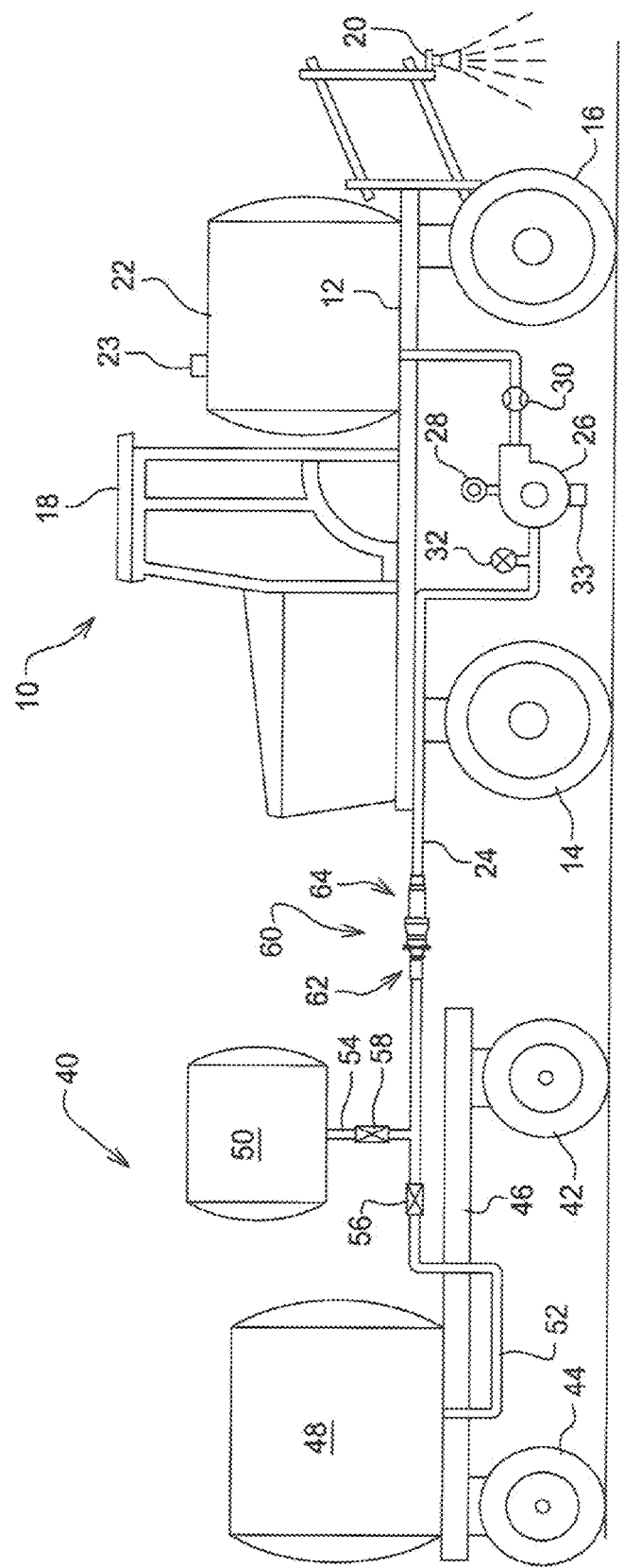
FIG. 1 is a schematic view showing a nurse vehicle fluid discharge conduit coupled to a sprayer vehicle inlet conduit over a releasable coupler arrangement.
Figure 2:
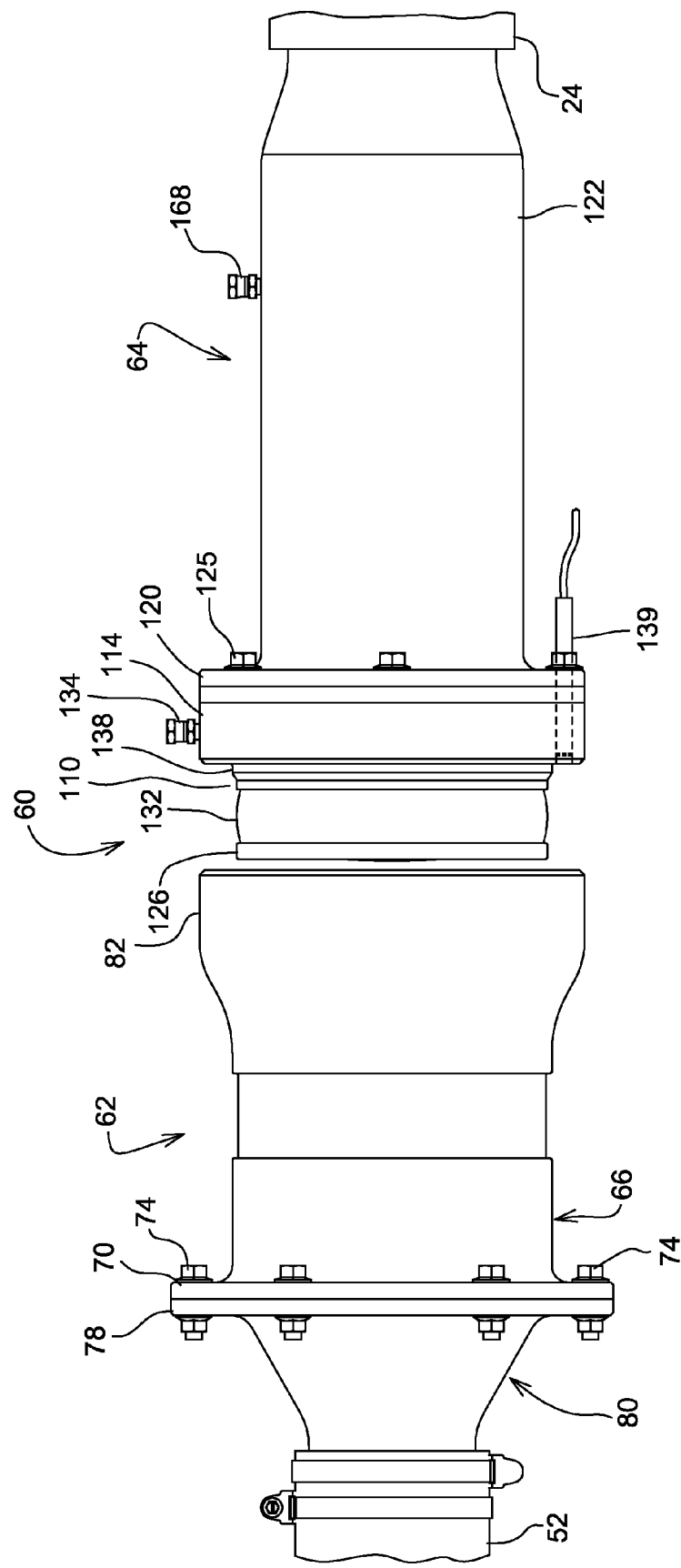
FIG. 2 is a side view of the coupler arrangement with the coupler sections being shown in a separated condition.
Figure 3:
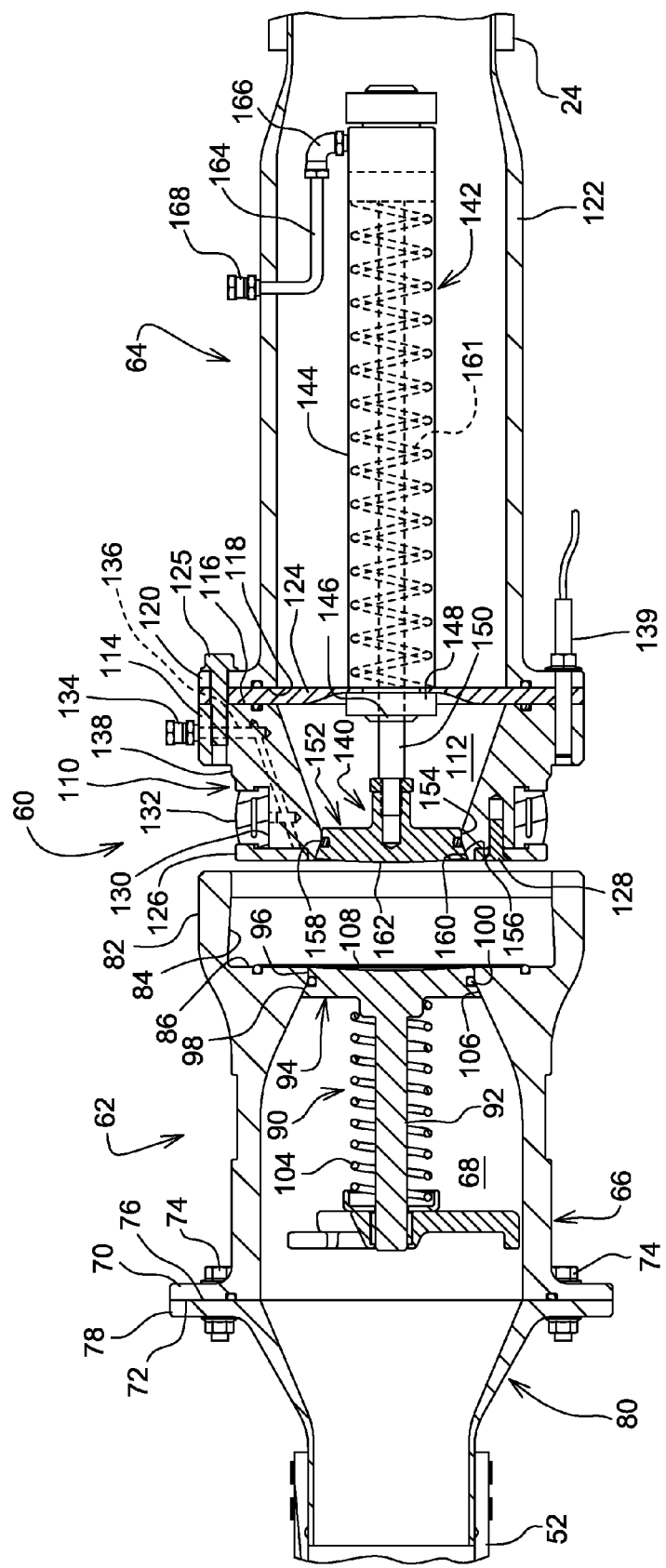
FIG. 3 is a vertical, longitudinal sectional view of the coupler arrangement shown in FIG. 2.

Referring now to FIG. 1, there is shown a self-propelled sprayer vehicle 10 positioned adjacent a nurse vehicle 40 during a refill operation. The sprayer vehicle 10 includes a frame 12 supported on front and rear pairs of ground wheels 14 and 16, respectively. Mounted on a central region between opposite ends of the frame is an operator's cab 18 which contains all of the controls (not shown) for controlling the operation of the sprayer vehicle 10 including the routing of fluid to spray nozzles of a spray boom 20 supported at a rear end of the frame 12. Fluid to be sprayed on a crop and/or the ground is contained in a tank 22 mounted on the frame 12 behind the cab 18, with it to be understood that the tank 22 is merely representative and that a plurality of sprayer tanks could be provided. A fluid level sensor 23 is provided on the tank 22 for monitoring the level to which the tank is filled. A fluid intake conduit 24 is coupled for filling the tank 22, and located in the conduit is a variable speed, high capacity, variable displacement load or transfer pump 26 serving for refilling the sprayer tank 22. A separate pump (not shown) is provided for drawing fluid from the tank 22 and supplying this fluid to the spray boom 20.

In order to maximize the operation of the load pump 26 for each of different plumbing configurations that typically might be encountered when refilling from different nurse tanks, the operation of the pump 26 is monitored. Specifically, the operation of the load pump 26 is monitored by a tachometer 28 coupled to the pump drive shaft, a flow detector 30 located at the output of the pump, a vacuum detector 32 located at the input of the pump and an accelerometer 33 coupled to a housing location of the pump for sensing pump vibration. All of the sensed or monitored pump conditions provide information to an automatic control arrangement and/or to a visual display so that the control arrangement may automatically operate or the operator may intervene to reduce the displacement of the pump 26 in the event that the sensed or monitored pump conditions indicate an impending pump cavitation condition. Of course, pump displacement may be increased when no impending cavitation condition is monitored.

The nurse vehicle 40 may be of any variety of known configurations, but is here shown in the form of a trailer having front and rear sets of ground wheels 42 and 44, respectively, which are normally interconnected by a framework, not shown, which supports a trailer bed 46 on which is positioned a large nurse tank 48, which in many cases would contain a supply of water, and a smaller nurse tank 50 which would contain a concentrated chemical for being mixed with the water, for example. A fluid transfer conduit 52 is coupled directly to the nurse tank 48 and is coupled to the smaller nurse tank 50 by a branch conduit 54. The fluid transfer conduit 52 contains a first flow meter 56 located just downstream from the larger nurse tank 48, while a second flow meter 58 is located in the branch conduit 54, with the flow meters 56 and 58 acting to ensure that a correct mixture of the fluids from the tanks 48 and 50 is transferred to the sprayer vehicle tank 22.

As illustrated, the fluid intake conduit 24 of the sprayer spray vehicle 10 and the fluid transfer conduit 52 of the nurse vehicle 40 are interconnected by a coupler assembly 60 including first and second separable coupler components, namely a receptacle indicated generally at 62 and an insert indicated generally at 64. With reference to fluid flowing in a direction from the fluid transfer conduit 52 to the fluid intake conduit 24, the receptacle 62 is connected to a downstream end of the transfer conduit 52 while the insert 64 is connected to an upstream end of the intake conduit 24. Appropriate on-off valves (not shown) would be provided for respectively isolating the insert 64 from a remaining portion of the intake conduit 24, and isolating the receptacle 62 from a remaining portion of the transfer conduit 52 when the coupler arrangement 60 is separated.

As can be seen in FIGS. 2-5, receptacle 62 comprises a generally cylindrical body 66 defining a flow passageway 68 there through. The body 66 comprises a flange 70 having an axially facing, annular mounting face 72 clamped, as by bolts 74, against a similar mounting face 76 defined by a flange 78 of a funnel-shaped body extension 80 having its smaller end received in and secured to the transfer conduit 52. The downstream end of the body 66 comprises an axially extending annular wall 82 having a cylindrical inner surface 84 joined to a radially extending annular surface 86 so as to define a receptacle for receiving an end of the insert 64.

Figure 4:
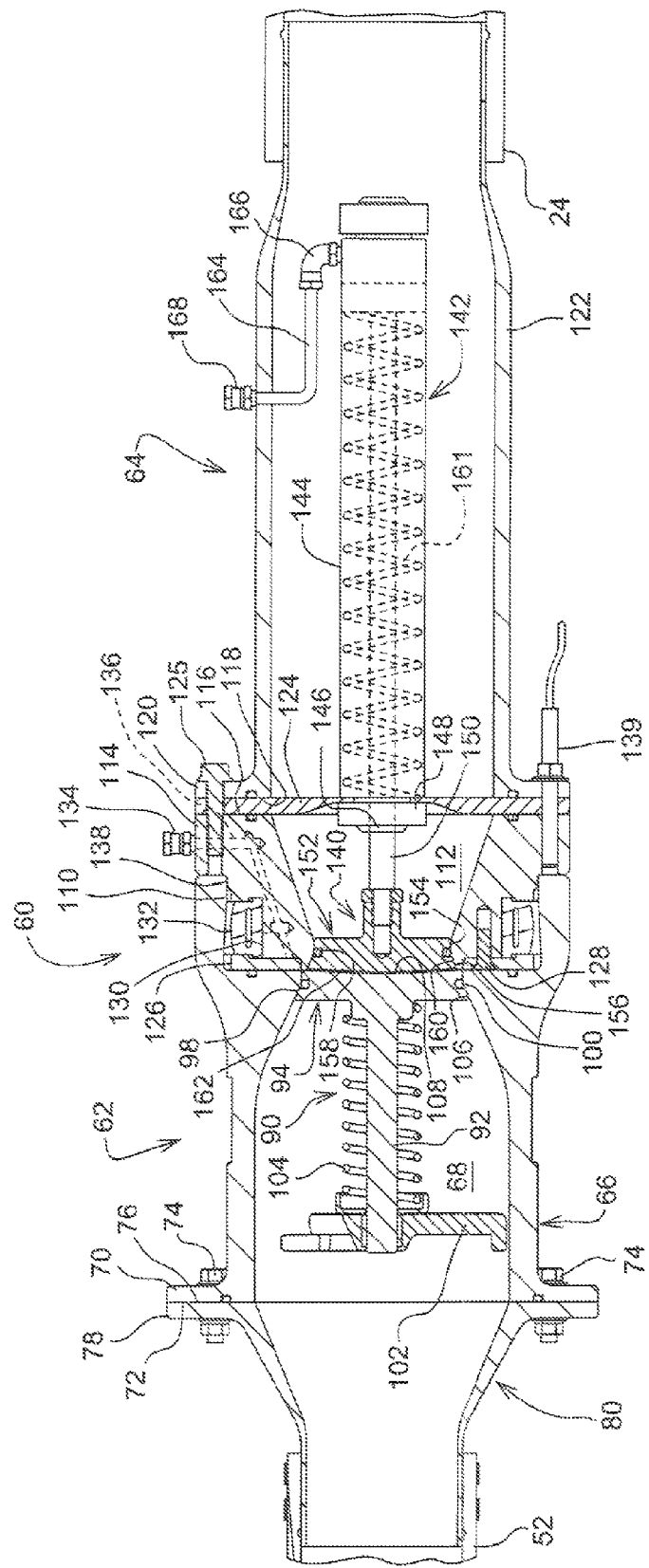
FIG. 4 is a view like FIG. 3, but showing the coupler sections seated together, with the poppet valves closed.

The receptacle 62 further includes a poppet valve 90 for sealing the flow passageway 68. Poppet valve 90 includes a stem 92 joined to a head 94 having a periphery defining a sealing surface including a leading cylindrical/pilot section 96 joined to a small diameter end of a frusto-conical section 98, with an o-ring seal 100 being located in a seal groove provided at a juncture of the two sections. The stem 92 is mounted for sliding axially within a bushing carried by a support member 102 fixed within the receptacle body 66. A coil compression spring 104 is received on the poppet valve stem 92 and acts between the support member 102 and the head 94 so as to normally bias the sealing surface of the poppet valve head 94 against a mating valve seat 106 at a discharge end of the passageway 68. An axial end face 108 of the poppet valve head 94 is a concave surface formed as a spherical segment and has an outer periphery which is substantially coplanar with the receptacle surface 86 when the poppet valve 90 is closed, as shown in FIG. 4.

Figure 5:
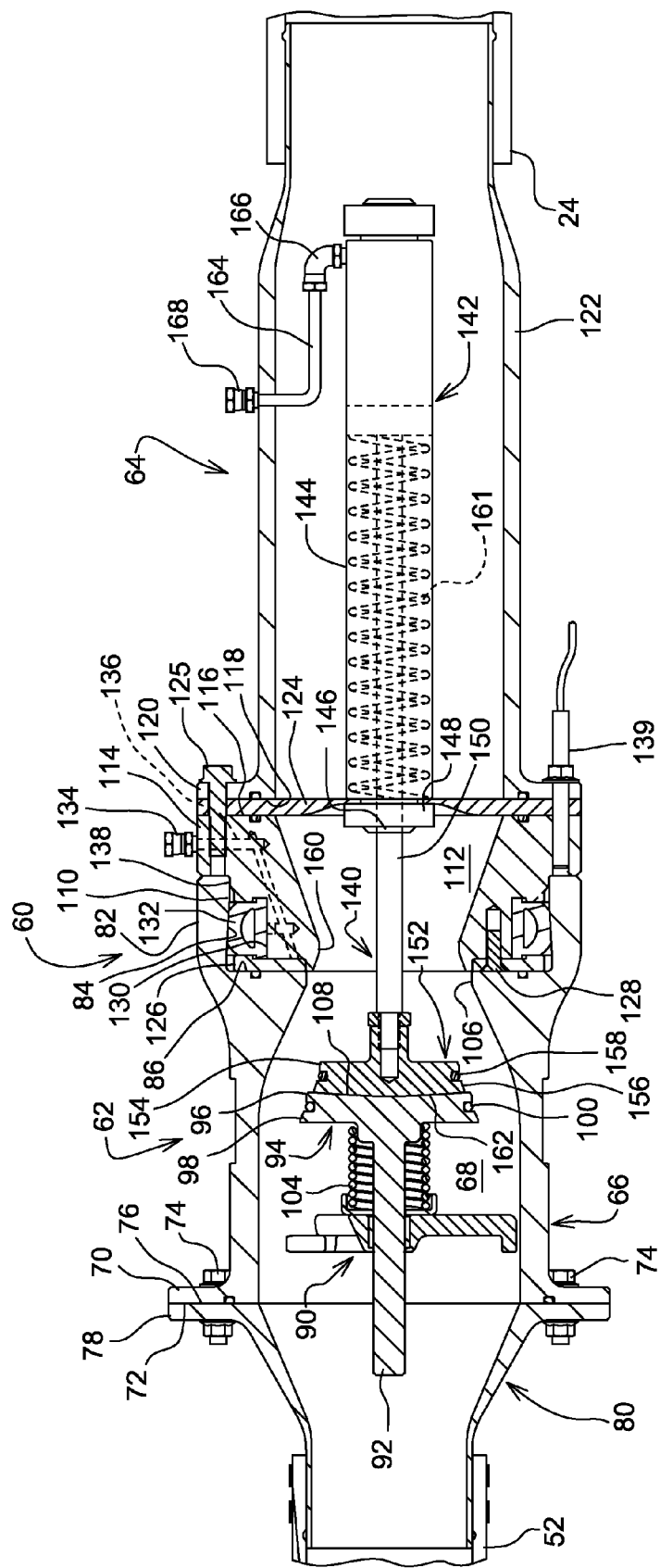
FIG. 5 is a view like FIG. 4, but showing the poppet valves opened.

The insert 64 includes a generally cylindrical body 110 defining a flow passageway 112 there through. A downstream end region of the body 110 is defined by a mounting flange 114 having an axially facing mounting surface 116 on its downstream end disposed in confronting relationship to a mounting surface 118 of a mounting flange 120 located on the upstream end of an elongate, cylindrical body extension 122 including a downstream end section which is reduced in diameter and connected to the intake conduit 24. A circular support plate 124 has an outer annular region clamped between the flanges 114 and 120 by a plurality of screws 125 extending through axially aligned holes provided in the flange 120 and plate 124 and received in threaded holes provided in the flange 114. The support plate 124 is provided with a plurality of openings (not shown) for permitting the free flow of fluid from the downstream end of the passageway 112. The upstream end of the insert body 110 is defined by an annular plate 126 fixed to a remainder of the body 110 by a plurality of screws 128. The plate 126 cooperates with a reduced diameter portion of the body 110 to define an annular seal groove 130, with an inflatable seal 132 being received in the seal groove 130. An air fitting 134 is provided on the flange 114 of the insert body 110 and leads to air passage 136 which extends to the inflatable seal 132. A cylindrical shoulder 138 is provided between the seal groove 130 and the flange 114 and is sized to fit snuggly within the cylindrical wall 82 of the receptacle body 66 when the insert body 110 is received in the receptacle of the receptacle body 66, as shown in FIGS. 4 and 5. When so received, the insert 64 may be locked within the receptacle 62 by inflating the seal 132 by connecting a source of air pressure 133 to the fitting 134. So as to insure that the insert body 110 is received in the receptacle of the receptacle body 66 prior to the seal 132 being inflated, a proximity sensor or sensors 139 is (are) provided in the flange 114 in axial alignment with an end face of the wall 82, with the sensor(s) 139 generating a signal when the insert body 110 is properly received in the receptacle body 66.

The insert 64 further includes a poppet valve 140 for sealing flow through the flow passageway 112 and a remotely controlled poppet valve actuator 142 is provided for selectively opening and closing the poppet valve. The valve actuator 142 comprises a single-acting, extensible and retractable air cylinder 144 (alternatively a hydraulic or electric actuator could be) disposed along a central axis of the body extension 122 and having a threaded tube 146 fixed to an upstream end cap, the tube 146 projecting through a hole provided centrally in the support plate 124 and receiving a nut 148 which is tightened against the plate 124 so as to fix the cylinder 144 to the support plate 124. The poppet valve 140 comprises a stem defined by a piston rod 150 of the air cylinder 144, and a head 152 screwed onto a threaded end of the piston rod. As considered relative to moving from an open position, illustrated in FIG. 5, to a closed position, illustrated in FIGS. 2 and 3, an outer periphery of the poppet valve head 152 defines a sealing surface including a leading cylindrical pilot section 154 followed by a frusto-conical section 156. A seal groove containing an o-ring seal 158 is located at the juncture of the two sections 154 and 156. The inlet end region of the flow passageway 112 is defined by a valve seat 160 configured to mate with the sealing surface of the valve head 152. A coil compression spring 161 is received about the piston rod 150 internally of the air cylinder 144 and acts against a piston secured to the rod 150 so that a biasing force acts on the poppet valve head 152 in a direction tending to seat the sealing surface 156 against the valve seat 160 so as to prevent spillage when the coupling 60 is separated. Spillage of fluid when the coupling 60 is separated is also reduced by providing the valve head 152 with an axial face 162 in the form of a convex segment of a sphere sized to mate with the concave axial face 108 of the valve head 94 so that no fluid is trapped between the valve heads 94 and 152 that would escape when the coupling 60 is separated. It is to be noted that the shape of the axial faces of the valve heads 94 and 152 permits the heads to be slightly misaligned without affecting their tight engagement with one another. Also, it is to be noted that the valve head 94 of the poppet valve 90 associated with the receptacle 62 has a minor diameter which is just slightly larger than a major diameter of the valve head 152 of the poppet valve 140 associated with the insert 64 and that, when the poppet valves 90 and 140 are open, the distance between the circumference of the valve heads 94 and 152, and a frusto-conical inner wall surface region of the receptacle body 66 is substantially constant so that a smooth flow occurs around the open valve heads.

An air supply/return conduit 164 is located within the insert body extension 122 and has opposite ends respectively coupled to an L-fitting 166 located adjacent one end of the cylinder 144 and a straight air fitting 168 extending through an end region of the insert body extension 122 adjacent the intake conduit 24. Located at an opposite end of the cylinder 144 from the fitting 166 is another fitting (not shown) which is coupled to an air line leading to atmosphere for permitting the exhaust and intake of air during extension and retraction of the piston rod 150 so that an air lock preventing free movement of the piston rod does not occur. It will be appreciated that the source of air pressure 133 can be selectively coupled to an air line 180 (shown only in FIG. 6) joined to the straight air fitting 168 in order to effect extension of the piston rod 150 and simultaneous movement of the poppet valve heads 94 and 152 from their seated closed positions, shown in FIG. 4, wherein fluid flow through the passage ways 68 and 112 is prevented, to their open positions shown in FIG. 5, wherein a continuous flow path is provided from the transfer conduit 52 to the intake conduit 24 by way of the flow passageways 68 and 112.

Figure 6:
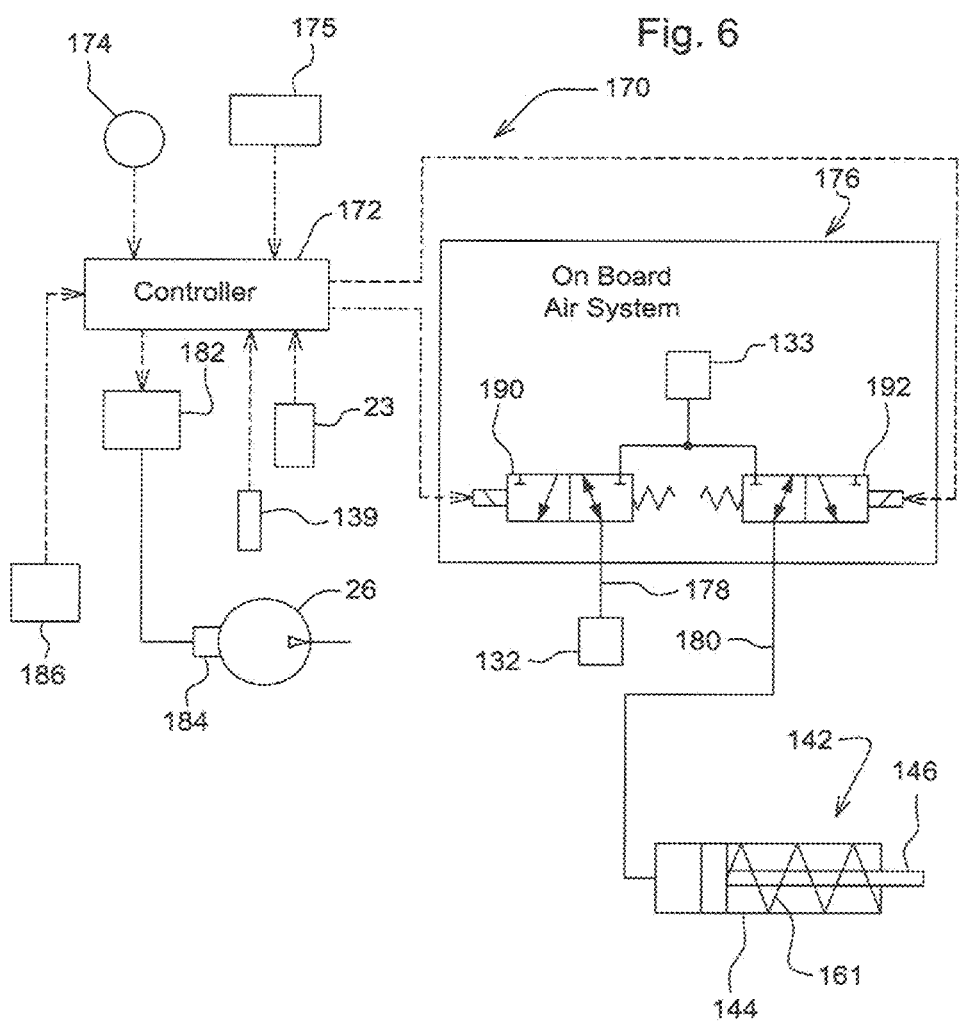
FIG. 6 is a schematic representation of an electro-hydraulic control circuit for controlling the opening of the poppet valves incorporated in the coupler arrangement.

Referring now to FIG. 6, there is shown a representative electro-pneumatic circuit 170 for controlling the operation of the pneumatic actuator 142 for controlling the opening and closing of the poppet valves 90 and 140. It is to be noted that since the self-propelled sprayer vehicle 10 has an electric power supply, such as a battery, all of the powered components or elements of the coupler arrangement 60 are associated with the insert 64 so as not to require further coupler elements between the nurse tank vehicle and the sprayer vehicle.

The control circuit 170 includes an electronic controller 172 to which is connected the tank level sensor 23, the proximity sensor(s) 139 and an indicator device 174, such as a display device located in the sprayer vehicle cab 18. An operator input device 175, which may include an activation switch, for example, is provided by which the operator can send a start signal for initially arming the controller 172 for the automatic filling operation, with automatic filling beginning once a signal is received from the proximity sensor(s) indicating that the coupler assembly 60 is coupled. Also coupled to the controller 172 is an on board air system 176 including the source of air pressure 133 coupled to first and second electrically responsive control valves here depicted as solenoid valves 190 and 192, respectively, for selectively either controlling the flow of air from the source of air pressure 133 to the inflatable seal 132 by way of an air supply line 178, and to the pneumatic actuator 142 by way of the air supply line 180. Additionally, the controller 172 is connected to an electrically responsive displacement control valve arrangement 182, which, in turn is coupled to a displacement controller 184 of the variable displacement load pump 26. The pump condition monitoring components, specifically the tachometer 28, flow detector 30, vacuum detector 32, and accelerometer 33 are designated collectively as a pump condition monitoring arrangement 186 that is likewise coupled to the controller 172, with it to be understood that respective pump condition signals are generated by each of the components. Further, it is to be noted that not all of the condition monitoring components are required for acquiring sufficient information for a determination of impending pump cavitation.

Assuming an operator is performing a spraying operation, the operator will become aware of the need to refill the tank 22 by a signal sent by the fluid level sensor 23 which is sent to the indicator device 174 at the operators station. The operator will then shut down the sprayer pump and drive the sprayer vehicle 10 to the staging area where the nurse tank vehicle 40 has been previously parked for refilling the sprayer tank 22.

The operator will then arm the controller 172 for performing an automatic fill operation by hitting the activation switch of the input device 175. The operator then takes steps to bring the coupler insert 62 and receptacle 64 of the coupler assembly 60 into axial alignment with each other and to move them together, with the insert 62 being located within the receptacle 64. Upon the insert 62 becoming completely received in the receptacle 64, the proximity sensor(s) 139 will send a coupled signal to a sequencing logic arrangement of the controller 172 so as to initiate the automatic fill operation. The sequencing logic circuit first acts to send a lock signal to a first solenoid-operated air valve 190 of the onboard air system 176 for causing the air valve to shift so that the source of air pressure 133 is automatically routed for effecting inflation of the seal 132, thereby locking the coupler insert 62 and the receptacle 64 together. Following this, the sequencing logic circuit within the controller 172 sends an open signal to a second solenoid-operated air control valve 192 of the onboard air system 176 for causing the air valve to shift so that the source of air pressure 133 is automatically routed for effecting extension of the pneumatic actuator 142, and, thus, opening of the poppet valves 90 and 140. The sequencing logic contained in the controller 172 then acts to send a signal for actuating the appropriate solenoid of the electrically responsive displacement control valve arrangement 182 for causing the latter to control the flow of hydraulic fluid to the displacement controller 184 of the pump 26 so as to ramp-up displacement of the pump 26 so that it begins to transfer fluid from the nurse vehicle 40 to the sprayer vehicle 10.

Pump operation is monitored by the tachometer 28, flow detector 30, vacuum detector 32 and the accelerometer 33, with these devices sending respective signals to the controller 172. In the event that the monitored or sensed operating condition of the pump 26 indicates that cavitation is impending, the controller 172 will send a signal to the electrically responsive displacement control valve arrangement 182 for causing the latter to route a control fluid signal to the displacement controller 184 of the pump 26 to cause the displacement to be decreased sufficiently to avoid cavitation.

Upon the sprayer tank 22 becoming filled, the fluid level sensor 23 will send a full signal to the controller 172 which then sends a ramp-down signal to the electrically responsive displacement control valve arrangement 182 which sends a fluid control signal to the displacement controller 184 of the pump 26 to decrease its displacement to zero. Shortly thereafter, the sequencing logic section of the controller 172 will receive a close signal and will terminate the open signal previously sent to the second solenoid-operated air control valve 192 of the on board air system so as to effect the venting of the air from the air line 180 thus permitting the springs 161 and 104 to act to close the poppet valves 90 and 140. Subsequently, the sequencing logic section of the controller 172 will receive an unlock signal and will terminate the lock signal previously sent to the first solenoid-operated air control valve 190 of the air system so as to vent the air from the inflatable seal 132. The indicator device 174 at the operator station will also receive the unlock signal and display the fact that the insert 62 and receptacle 64 of the coupler arrangement 60 are no longer locked together. The refill operation is then completed and the operator can separate the insert 62 from the receptacle 64 and drive the sprayer 10 away from the nurse vehicle 40 and return to the field to resume the spraying operation.

Thus, it will be appreciated that once the operator arms the control system for automatic refill operation and the controller receives a signal from the proximity sensor(s) 139 indicating that the insert 62 and receptacle 64 of the coupler arrangement 60 are coupled together, the remainder of the refill operation is automatic with a substantially leak-free coupling being established prior to the opening of the poppet valves 90 and 140. Further due to the poppet valve heads 94 and 152 being respectively biased against the valve seats 106 and 160 by the springs 104 and 161, and due to the close fit of the valve head faces 108 and 162 with each other during flow through the coupler arrangement 60, no fluid escapes around, and no fluid is trapped between the valve heads when the poppet valves close immediately after ramp-down of the pump 26 after the sprayer tank 22 is filled, thus eliminating any spillage from this area when the coupler arrangement 60 is separated.

Having described the preferred embodiment, it will become apparent that various modifications can be made without departing from the scope of the invention as defined in the accompanying claims.

The invention claimed is:

1. A fluid coupler arrangement for connecting a nurse vehicle fluid transfer conduit to a sprayer vehicle intake fluid conduit so as to form a continuous flow path through the fluid coupler arrangement, said fluid coupler arrangement comprising: a first coupler section including an insert body defining a first flow passageway there through and a second coupler section including a receptacle body defining a second flow passageway there through, with the receptacle body also defining a receptacle at one end for receiving an end region of said insert body; said first coupler section comprising a first poppet valve including a first valve seat formed fixed at one end of said first flow passageway and including a first valve head having a periphery biased into sealing engagement with said first valve seat; said second coupler section comprising a second poppet valve including a second valve seat formed fixed at one end of said second flow passageway and a second valve head having a periphery biased into sealing engagement with said second valve seat; said receptacle of said receptacle body having an axially extending annular end wall including an inner surface joined to said one end of said second flow passageway by a radially extending, annular surface; said end region of said insert body defining a seal groove bridged by said inner surface when said end region is located within said receptacle against said radially extending annular surface; and an inflatable seal being located in said seal groove and acting, when inflated, for locking said receptacle body and said insert body together while preventing leakage, wherein each of said first and second valve seats includes a cylindrical section joined to a frusto-conical section; and the peripheries of said first and second valve heads being respectively shaped for mating with said cylindrical and frusto-conical sections of said first and second valve seats.

2. A fluid coupler arrangement, for connecting one fluid conduit to another fluid conduit to form a continuous flow path, combined with a control arrangement, comprising: said fluid coupler arrangement including a first separable coupler section comprising a receptacle and a second separable coupler section comprising an insert having an end region adapted for being received in said receptacle, with said end region being provided with an annular seal groove; an inflatable seal being located in said annular seal groove; a source of air pressure; a first electrically responsive valve coupled to said source of air pressure and to said inflatable seal and responsive when energized for connecting the source of air pressure to said inflatable seal; a proximity sensor arrangement being mounted to one of said insert and receptacle for sensing when said insert is properly located in said receptacle and for generating an electrical coupled signal; an electronic controller coupled for receiving said coupled signal and for sending a lock signal to energize said first electrically responsive valve upon receiving said coupled signal; said receptacle including a receptacle body defining a first fluid passageway there through; said insert including an insert body defining a second fluid passageway there through; first and second poppet valves respectively provided in said first and second fluid passageways and including first and second valve seats at first ends of each of said first and second passageways, and first and second poppet valve heads disposed and shaped for respectively mating with said first and second valve seats when in seated closed positions for preventing flow through said first and second passageways, with said first and second poppet valve heads having respective first and second axial end faces which are engaged with each other when the first and second valve heads are in their closed positions and the insert is properly positioned in said receptacle; an extensible and retractable pneumatic actuator being coupled for effecting shifting movement of one of said first and second valve heads for selectively moving said one of said valve heads from said seated closed position to an open position upon receiving air pressure; a second electrically responsive valve being coupled to said source of air pressure and to said pneumatic actuator and being responsive to receiving an open signal for routing air pressure to the pneumatic actuator; a spring being coupled to another of said first and second valve heads for biasing said another of said valve heads to its closed position; said first and second valve heads having respective axial end faces engaged with each other when said fluid coupler arrangement is coupled and said valve heads are in their closed positions; and said electronic controller being responsive to receiving said coupled signal from said proximity sensor arrangement for sending said lock signal to said first electrically responsive valve, whereby inflation of said inflatable seal is automatically effected to lock said first and second separable sections of said fluid coupler arrangement together, and with the electronic controller then sending said open signal to said second electrically responsive valve, whereby said poppet valves are opened after said insert is properly located and locked in said receptacle.

3. The fluid coupler arrangement, as defined in claim 2, and further including an indicator device coupled to said electronic controller for notifying an operator when said insert is properly seated in said receptacle; and, therefore, when said inflatable seal is inflated, thereby indicating said first and second separable sections of said coupler are locked together and sealed.

4. A fluid transfer system for transferring fluid to a sprayer vehicle tank from a nurse vehicle tank, comprising: a fluid coupler arrangement including a receptacle coupled to one of the sprayer vehicle tank and the nurse vehicle tank and an insert coupled to another of said sprayer vehicle tank and said nurse vehicle tank, with said insert being dimensioned for fitting closely within said receptacle to establish a coupled condition, with said fluid coupler arrangement then defining a central fluid path for conveying fluid in a flow direction from said nurse vehicle tank to said sprayer vehicle tank; a proximity sensor located for sensing when said coupled condition occurs and for generating a coupled signal; a normally unlocked, remotely operable, air pressure responsive locking arrangement being selectively operable to lock said insert and receptacle together when in said coupled condition; a valve arrangement including first and second flow control valves respectively located in said insert and said receptacle and being biased to normally closed positions by first and second springs; a remotely operable, air pressure responsive valve actuator being coupled for effecting opening of said first and second flow control valves upon receiving air pressure; a source of air pressure; first and second electrically responsive control valves being connected to said source of air pressure and respectively being connected to said locking arrangement and to said valve actuator; a variable displacement pump including a fluid responsive displacement controller and being coupled between said coupler arrangement and said sprayer vehicle tank for effecting fluid transfer from the nurse vehicle tank to the sprayer vehicle tank when said coupler arrangement is in its coupled condition; an electrically responsive displacement control valve arrangement being fluidly coupled to said displacement controller; a fluid level sensor being associated with said sprayer vehicle tank for sensing fluid level and for generating a full signal; an electronic controller containing a sequencing logic circuit and being connected to said proximity sensor, to said first and second electrically responsive valves, to said displacement control valve arrangement, and to said fluid level sensor; an operator input device being connected to said electronic controller and operable for selectively sending an activation signal, with said electronic controller being operable, once activated by the operator just prior to coupling said insert and receptacle to automatically sequentially:
  a. act in response to receiving a coupled signal from said proximity sensor to send a lock signal to said first electrically responsive control valve so as to cause said locking arrangement to assume a locked condition securing said insert and receptacle together;
  b. to send an open signal to said second electrically responsive control valve so as to cause said valve actuator to open said first and second flow control valves;
  c. to send a ramp-up signal to said electrically responsive displacement control valve arrangement which routes control fluid connected to the displacement controller so as to cause a displacement increase in said variable displacement pump;
  d. act in response to receiving the full signal from the fluid level sensor to send a ramp-down signal to said electrically responsive displacement control valve arrangement which routes control fluid connected to the displacement controller so as to cause a zero displacement condition in said variable displacement pump;
  e. to send a close signal to the second electrically responsive control valve so as deactivate said second electrically responsive control valve so as to vent pressurized air from said valve actuator, thus permitting said first and second flow control valves to return to their normal closed positions; and finally
  f. to send an unlock signal to the first electrically responsive control valve so as to deactivate said first electrically responsive control valve so as to vent pressurized air from said locking arrangement, thereby permitting the separation of said insert and receptacle of said coupler arrangement.

5. In combination with a variable displacement fluid transfer pump used for transferring fluid from a nurse tank to a sprayer tank, a control system for optimizing operation of said fluid transfer pump, comprising: said fluid transfer pump having a displacement controller; an electrically responsive displacement control valve coupled for routing a control fluid to said displacement controller; a pump condition monitoring arrangement associated with said fluid transfer pump and comprising at least one of a plurality of components including a vacuum detector coupled to an inlet side of the fluid transfer pump, a flow detector coupled to an outlet side of the fluid transfer pump, a tachometer at a drive shaft for the fluid transfer pump and an accelerometer mounted to a housing of the fluid transfer pump, with said at least one of said plurality of components generating a pump condition signal; an electronic controller connected to said at least one of said plurality of components for receiving said pump condition signal; said electronic controller being programmed for recognizing when a received pump condition signal indicates an impending cavitation condition in the pump and, in response to receiving such a pump condition signal, for acting to send a control signal to said electrically responsive displacement control valve causing the electrically responsive displacement control valve to modify the control fluid sent to said displacement controller so as to effect the decrease in transfer pump displacement.

* * * * *